United States Patent [19]

Zervos

[11] Patent Number: 4,896,496
[45] Date of Patent: Jan. 30, 1990

[54] SINGLE PRESSURE STEAM BOTTOMING CYCLE FOR GAS TURBINES COMBINED CYCLE

[75] Inventor: Nicholas Zervos, Norfolk, Mass.

[73] Assignee: Stone & Webster Engineering Corp., Boston, Mass.

[21] Appl. No.: 223,564

[22] Filed: Jul. 25, 1988

[51] Int. Cl.⁴ .............................................. F02C 6/18
[52] U.S. Cl. ................................ 60/39.02; 60/39.182; 122/7 R
[58] Field of Search ............... 60/39.02, 39.182, 39.03, 60/39.04, 39.05; 122/7 R, 7 B

[56] References Cited

U.S. PATENT DOCUMENTS

| | | |
|---|---|---|
| 2,653,447 | 9/1953 | Heller .................................. 122/480 |
| 2,967,397 | 1/1961 | Vogler . |
| 3,164,958 | 1/1965 | Pacault . |
| 3,277,651 | 10/1966 | Augsburger . |
| 3,304,712 | 2/1967 | Pacault et al. ..................... 60/39.182 |
| 3,325,992 | 6/1967 | Sheldon ............................. 60/39.182 |
| 3,331,202 | 7/1967 | Brunner . |
| 3,667,217 | 6/1972 | Vidal et al. . |
| 3,675,426 | 7/1972 | Vidal et al. ....................... 60/39.182 |
| 3,691,760 | 9/1972 | Vidal et al. . |
| 3,769,795 | 11/1973 | Rostrom ............................. 122/7 R |
| 4,300,353 | 11/1981 | Ridgway . |
| 4,430,962 | 2/1984 | Miszak . |
| 4,664,067 | 5/1987 | Haneda et al. ..................... 122/7 R |

Primary Examiner—Louis J. Casaregola
Attorney, Agent, or Firm—Hedman, Gibson, Costigan & Hoare

[57] ABSTRACT

A process for recapturing waste heat from a gas turbine at a single pressure to drive both a high pressure-high temperature steam turbine and a low pressure steam turbine. By placing the reheat coil of the low pressure steam turbine in a common vessel with a portion of the economizer coil (used to preheat the steam for the high pressure-high temperature steam turbine), maximum heat recovery from the exhaust gases of the gas turbine is obtained at a single pressure.

13 Claims, 4 Drawing Sheets

SINGLE PRESSURE STEAM BOTTOMING CYCLE FOR GAS TURBINES COMBINED CYCLE

FIELD OF INVENTION

This invention relates to a process and system for efficiently recapturing waste heat from the exhaust of a gas turbine. More specifically, the invention relates to a process and system for driving a high pressure-high temperature steam turbine and a low pressure steam turbine using the recaptured heat from the exhaust of a gas turbine. Most specifically, the invention relates to a process and system to efficiently recapture the waste heat from the exhaust of a gas turbine to drive a high pressure-high temperature steam turbine and a low pressure steam turbine by locating the reheat coil of the low pressure steam turbine in a common vessel with a portion of the economizer coil which preheats the steam for the high pressure-high temperature steam turbine, wherein the temperatures of the fluids within both the economizer coil and the reheater coil are below the pinch point.

DESCRIPTION OF THE PRIOR ART

In all power generating systems, thermal performance is directly influenced by both fuel costs and operating efficiency. As fuel costs increase, the focus and demand for increasingly efficient thermal processes correspondingly increase. As a result, utilities are intensifying their consideration of alternative methods of recapturing energy from waste heat streams. The benefits of such waste heat utilization must be balanced against the costs of recapture measured by both capital and operating costs, including fuel.

Many methods have been employed which minimize heat loss thereby maximizing energy efficiency. Processes have been designed which reheat the discharge of a high pressure-high temperature steam turbine for delivery to a low pressure steam turbine. Exhaust streams have long been used to increase the temperature and pressure of steam for a high pressure-high temperature steam turbine. Similarly, gas turbines have been coupled with steam turbines to maximize energy output. Each system has used reheating technology in serial steps or in combination with the superheater, but none have employed a combined service reheater-economizer apparatus to achieve a more efficient process at a single pressure.

Conventionally, when heat recovery systems are employed, the waste heat of a gas turbine is used to preheat, evaporate, and superheat boiler feedwater to drive a steam turbine thus producing additional power beyond that which is provided by the gas turbine. In such combined cycle power plants, the steam cycle is known as the "bottoming" cycle.

As the heat absorption profile of the steam cycle approaches the heat release profile of the gas turbine exhaust, the efficiency of the bottoming cycle increases. The customary method to match the heat release profile is to employ multiple pressure heat recovery steam generators. The profile of a known double pressure heat recovery steam generating cycle is shown in FIG. 3. It is current practice to reheat the bottoming cycle steam in a temperature range above that of the saturation temperature of the incoming boiler feed. (The incoming boiler feedwater saturation temperature is referred to as the pinch point temperature.) The reheating is therefore achieved at the expense of some steam generation, thus making the mismatch between the heat absorption profile and the heat release profile of the gas turbine exhaust worse. The customary practice is then to reheat the steam to, or near, the original superheated temperature.

SUMMARY OF THE INVENTION

It is an object of the invention to provide a process and system to efficiently recapture waste heat from the exhaust of a gas turbine.

It is another and more specific object of the invention to provide a process and system to drive a high pressure-high temperature steam turbine and a low pressure steam turbine using the recaptured heat from the exhaust of a gas turbine.

It is a further object of the invention to provide a process and system to efficiently recapture the waste heat from the exhaust of a gas turbine to drive a high pressure-high temperature steam turbine and a low pressure steam turbine performing the reheating of the steam between the high pressure-high temperature steam turbine and the low pressure steam turbine in a temperature range which is entirely below the pinch point, and by locating the reheat coil of the low pressure steam turbine and a portion of the economizer coil, which preheats the feedwater for the high pressure steam boiler in a common chamber through which the hot exhaust gas passes.

The system of the invention comprises two coupled assemblies: the high pressure-high temperature steam turbine assembly and the low pressure steam turbine assembly. The high pressure-high temperature steam turbine assembly consists of a low temperature preheater, a deaerator, a boiler feed pump, an economizer-reheater apparatus, a high pressure boiler, a superheater, and a high pressure-high temperature steam turbine. The low pressure steam turbine assembly consists of the economizer-reheater apparatus, a condenser, a condensate pump, and a low pressure steam turbine.

In operation, the exhaust of a gas turbine heats steam to effect the driving of both steam turbines before being vented as stack gas. This is accomplished by heating each heat exchange coil of both assemblies with the gas turbine exhaust. The economizer-reheater apparatus is shared as a common component of the two assemblies. Within the economizer-reheater apparatus, the discharge from the high pressure-high temperature steam turbine is reheated in the reheating coil for the low pressure steam turbine, as the economizer coil simultaneously heats the feedwater for the boiler. By reheating the exhaust of the high pressure-high temperature steam turbine to a temperature just below the pinch point of the boiler, effective use is made of the heat content of the gas turbine exhaust without the complexity of an additional lower pressure boiler. The use of a relatively high inlet pressure, and relatively low outlet pressure of the steam passing through the high pressure-high temperature steam turbine allows the reheating of the steam to be done in a particularly low temperature range. The low pressure steam turbine assembly therefore operates more efficiently, and the system is less complex than multiple-pressure systems of comparable capacity. The addition of the steam reheat duty with the economizer coil brings the combined absorption profile very close to the exhaust gas heat release profile below point (P) on FIG. 2 (the pinch point).

The simultaneous transfer of heat from the gas turbine exhaust to both the economizer coil and the reheater coil of the economizer-reheater apparatus can be accomplished by either of two methods. In the first method, the economizer coil and the reheater coil are intermingled in a common chamber of the economizer-reheater apparatus. In the other embodiment, each coil is installed in its own separate chamber. A partition is positioned separating each chamber within the economizer-reheater apparatus. In this alternative design, the heat from the exhaust of the gas turbine is apportioned betweeen the economizer coil and the reheater coil by means of the adjustable dampers.

BRIEF DESCRIPTION OF THE DRAWINGS

A specific embodiment of the invention will be described with reference to the following drawings wherein.

DESCRIPTION OF THE PREFERRED EMBODIMENT

The process of the invention has particular utility in power plants that have a waste heat source such as the exhaust from a gas turbine. The preferred embodiment is described in that environment.

Figure 1:
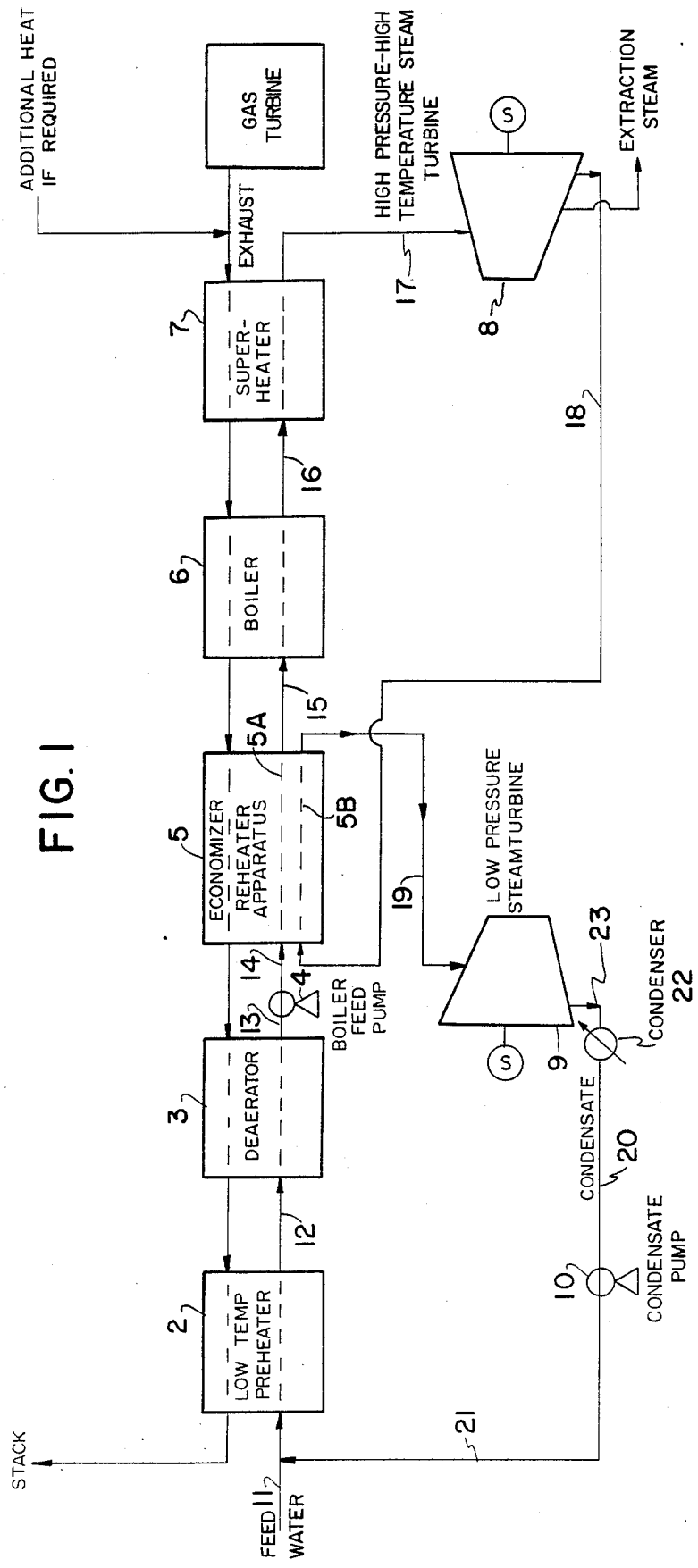
FIG. 1 is a schematic view of the process of the present invention.

As best seen in FIG. 1, the system comprises two assemblies which share a common component; the economizer-reheater apparatus 5. The high pressure-high temperature steam turbine assembly includes a low temperature preheater 2, a deaerator 3, a boiler feed water pump 4, the economizer-reheater apparatus 5, a high pressure steam boiler 6, a superheater 7, and a high pressure-high temperature steam turbine 8. The low pressure steam turbine assembly consists of the economizer-reheater apparatus 5, a condenser 22, a condensate pump 10, and a low pressure steam turbine 9. The economizer-reheater apparatus 5 comprises both an economizer coil 5A and a reheater coil 5B. The makeup water combined with the recycled condensate water enters the high pressure steam turbine assembly by a line 11 and is connected to the low temperature preheater 2. A line 12 connects the low temperature preheater 2 to the deaerator 3. A line 13 connects the deaerator 3 to the suction of the boiler water feed pump 4. A line 14 connects the discharge of the boiler water feed pump 4 to the economizer-reheater apparatus 5. The high pressure-high temperature steam turbine assembly is connected to the economizer coil 5A which is housed within the economizer-reheater apparatus 5. A line 15 connects the economizer coil 5A, of the economizer-reheater apparatus 5, to the high pressure steam boiler 6. A line 16 connects the high pressure steam boiler 6 to the superheater 7. The superheater 7 discharges the steam through a line 17 to the high pressure-high temperature steam turbine 8. A line 18 connects the discharge of the high pressure-high temperature steam turbine 8, to the low pressure steam turbine assembly by connecting to the reheater coil 5B of the economizer-reheater apparatus 5. A line 19 connects the discharge of the reheater coil 5B of the economizer-reheater apparatus 5 to the low pressure steam turbine 9. The exhaust of the low pressure steam turbine 9 is connected to a condenser 22 by a line 23 wherein the steam is condensed by heat exchange with any suitable coolant. The condensate from the condenser 22 is connected to the suction of condensate pump 10 by a line 20. A line 21 conducts the discharge of the condensate pump 10 to the low temperature preheater 2 completing the low pressure turbine assembly. The condensate line 21 joins the makeup water line 11 at this location. The superheater 7 is heated by the exhaust gases from the gas turbine. The gas turbine exhaust, discharged by the superheater 7, enters the high pressure boiler 6, and is further discharged to the economizer-reheater apparatus 5. In the economizer reheater apparatus 5, the gas turbine exhaust temperature is reduced, whereupon, it is then delivered to the deaerator 3. The gas turbine exhaust flows from the deaerator 3 to the low temperature preheater 2 from which is it vented to the atmosphere.

In operation, the makeup water enters the high pressure-high temperature steam turbine assembly by a line 11, combined with the condensate flow, and is connected to the low temperature preheater 2. The low temperature preheater 2 elevates the temperature of the feedwater-recycled condensate from its condensing temperature (preferably 100° F.) up to about 150° F. to 250° F. (preferably 165° F.). The feedwater is then conducted from the preheater 2 to the deaerator 3 by the line 12. The feedwater is deaerated so that it will be delivered to the economizer-reheater apparatus 5 with a great reduction in dissolved oxygen. The gas turbine exhaust elevates the feedwater temperature from the preheat coil exit temperature to about 220° F. to 250° F. within the deaerator 3 during the deaeration process. The deaerated feedwater is then conducted by the line 13 to the suction of the boiler water feed pump 4. The boiler water feed pump 4 then pumps the feedwater by the line 14 to the economizer coil 5A of the economizer-reheater apparatus 5. The economizer coil preheats the flow of feedwater-recycled condensate to, or near the boiling point associated with the system pressure (for example, 664° F.). The high pressure steam boiler 6, heated by the gas turbine exhaust, is operated between 1500 psia and 2700 psia, preferably at 2700 psia. In practice, the boiler feedwater flow is converted to saturated steam at the boiler's operating pressure by the high pressure steam boiler 6. The superheater 7 receives the discharge from the high pressure steam boiler 6 by the line 16 and further heats the steam to a temperature and pressure range of 750° F., 1200 psia to 1050° F. 2415 psia, preferably at 1005° F. and 2415 psia, whereupon it is delivered to the high pressure-high temperature steam turbine 8 by the line 17. The throttle and exhaust pressure of the high pressure-high temperature turbine 8 are selected to suit the particular gas turbine in order to more exactly match the heat release profile. In practice, the temperature and pressure range of the high pressure-high temperature steam turbine 8 discharge would be 250° F.@ 30 psia to 400° F.@ 200 psia, in this example 328° F.@ 100 psia. The temperature and pressure conditions can vary independently depending upon the high pressure-high temperature steam turbine throttle conditions. The line 18 conducts the high pressure-high temperature steam turbine 8 discharge to the reheater coil 5B of the economizer-reheater apparatus 5. The discharge of the reheater coil 5B has a temperature at or near the saturation temperature corresponding to the boiler pressure. In the example shown, the flow from the reheater coil 5B is discharged at 680° F. and 80 psia to the low pressure steam turbine 9. The condensate line 21 is provided to conserve and reuse the condensate from the low pressure steam turbine 9. In operation, the gas turbine exhaust has a temperature of 850° F. to 1200° F., preferably, 1106° F.

Figure 2:
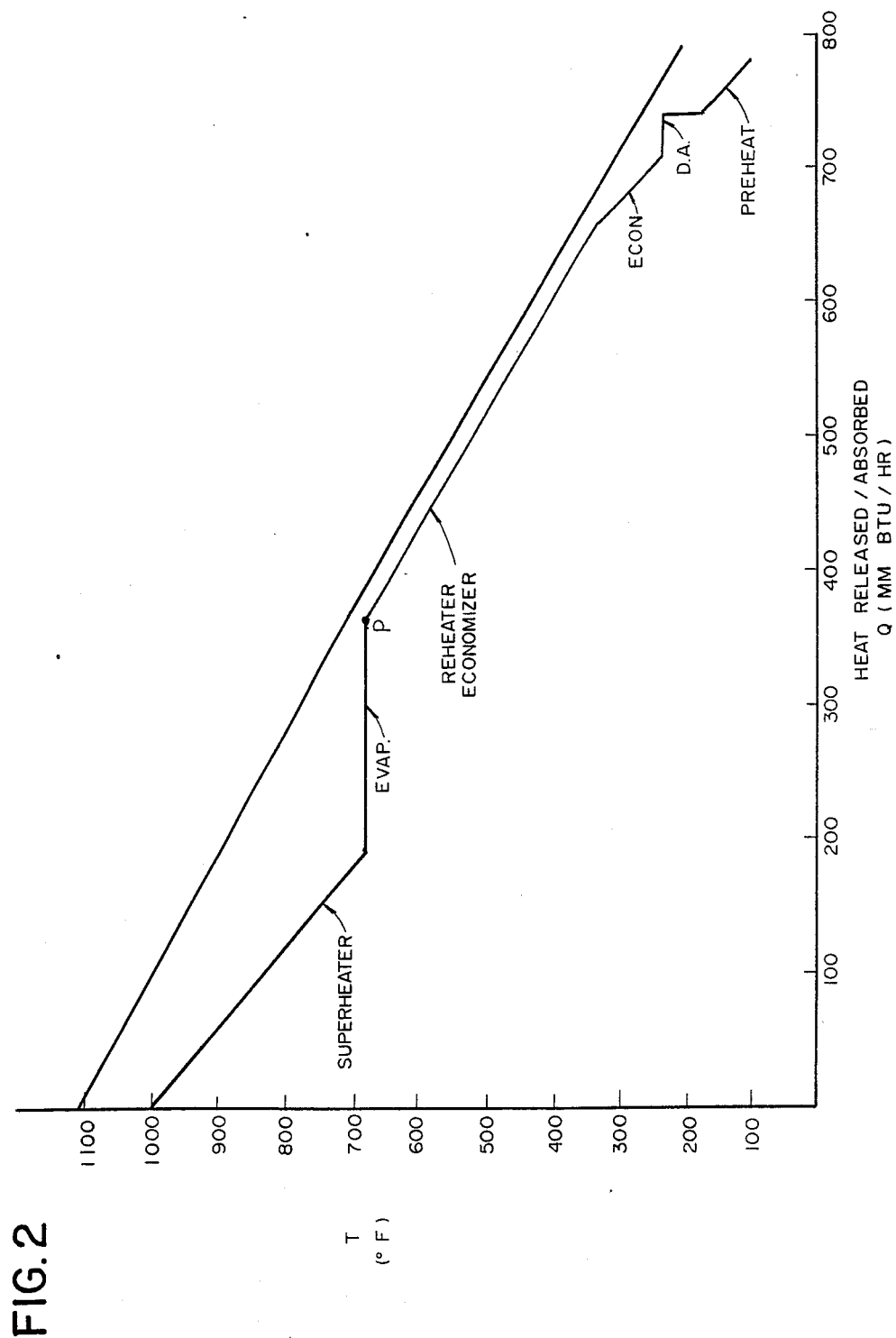
FIG. 2 is a plot of the heat released/heat absorbed profile of an example of the present invention.
Figure 3:
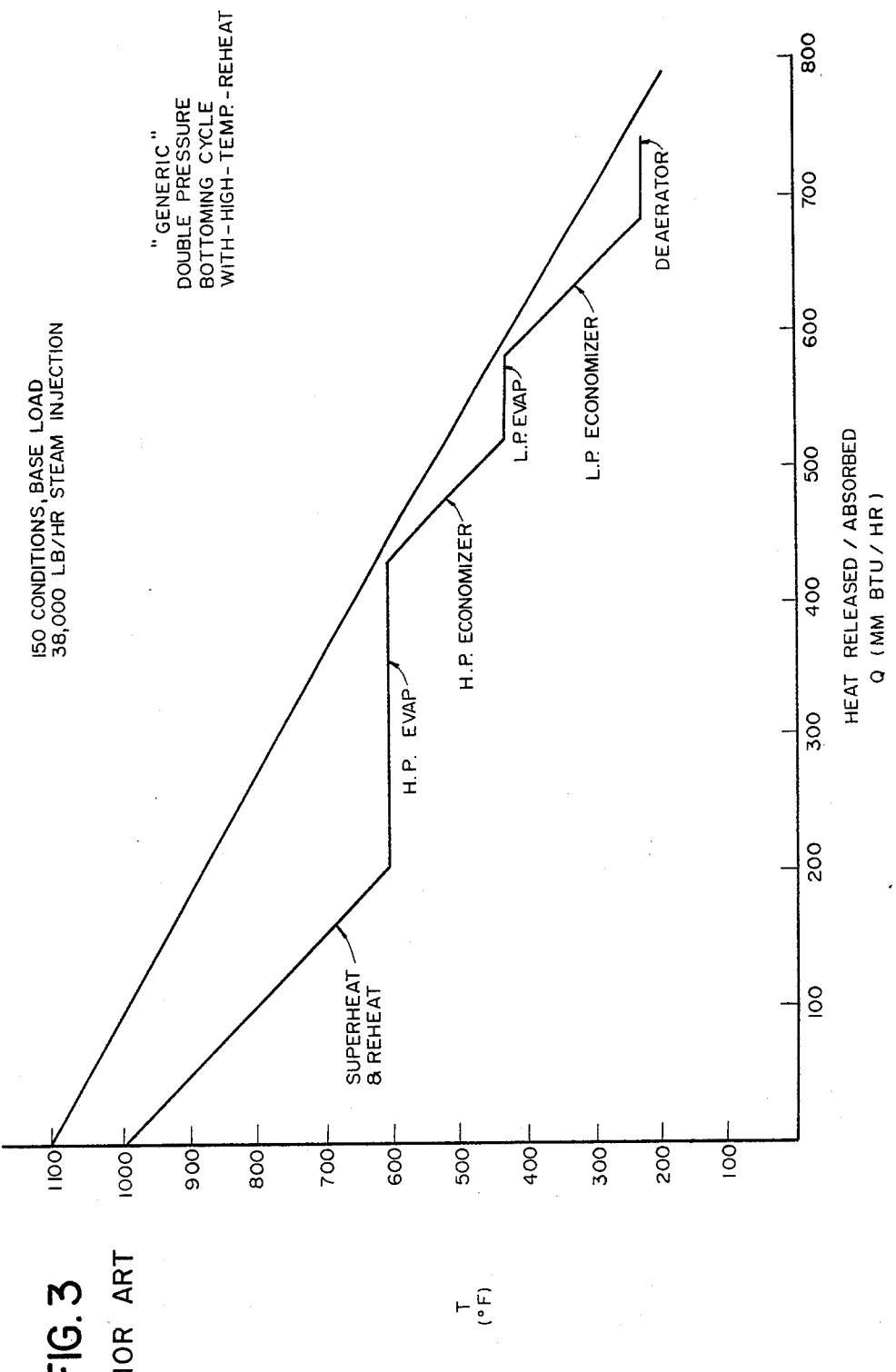
FIG. 3 is a plot of an example of the heat released/heat absorbed profile of the prior art, namely, a double pressured bottoming cycle using the same gas turbine exhaust conditions as FIG. 2.
Figure 4:
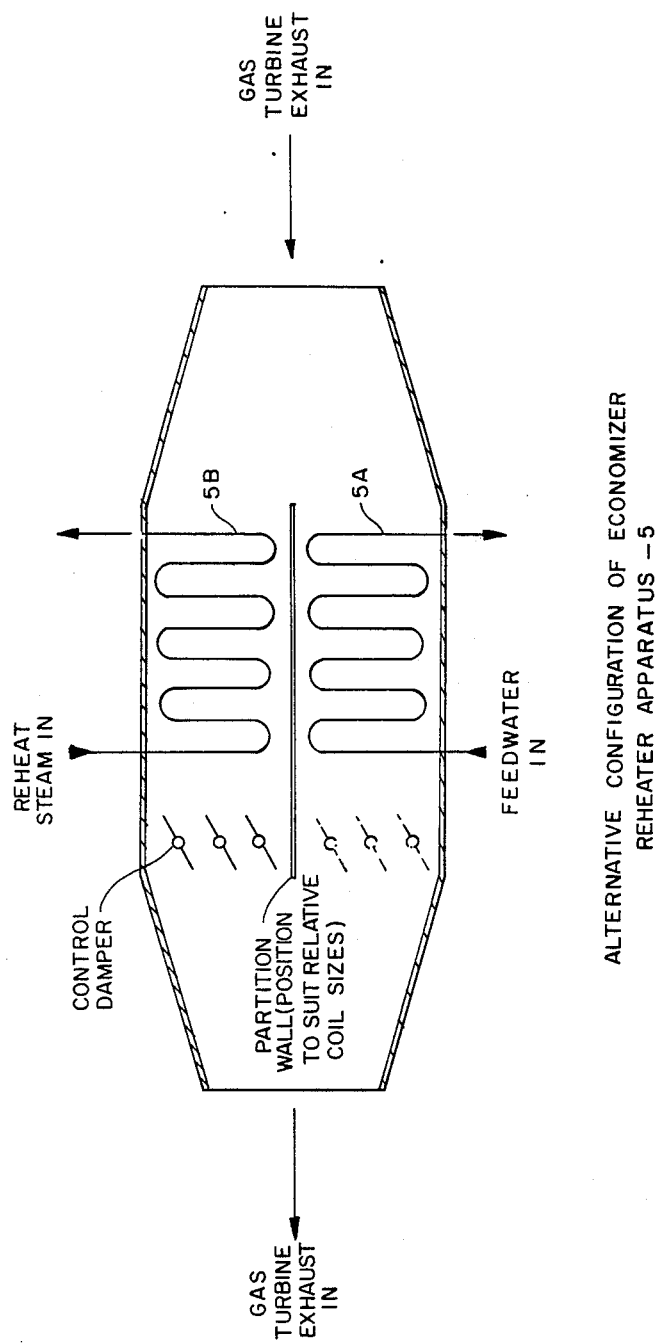
FIG. 4 is a drawing depicting an alternative configuration of the economizer-reheater apparatus.

The heat available in the exhaust of the gas turbine is illustrated by a plot of the exhaust temperature versus the exhaust heat release. The upper lines of FIG. 2 and FIG. 3 are a similar plot for a gas turbine such as the General Electric Frame 7F gas turbine. The heat absorbed by the water and steam is plotted on the lower lines of FIG. 2 and FIG. 3. In FIG. 3, the heat absorption line represents a conventional combined cycle double pressure system. Conventional heat absorption technology employs multiple pressure heat recovery units. This multiple pressure approach is illustrated by the stepped character of the heat absorptive line of FIG. 3. The closer the heat absorption profile approximates the heat release profile of the gas turbine, the higher the efficiency of the bottoming cycle. The comparative difference between the heat absorption profile of the conventional technology and the heat absorption profile of the invention (FIG. 2) with respect to the heat release profile is pronounced. Depending upon the particular gas turbine involved, additional heat may be added to the exhaust of the gas turbine if required. This may be accomplished by supplementary firing, using burners located in the line between the gas turbine and the superheater.

A prophetic example of the invention is as follows:

EXAMPLE

If the system is operated with a gas turbine such as the G.E. Frame 7F, the discharge of the gas turbine will be $3.296 \times 10^6$ lb./hr. having a temperature of 1106° F. The gas turbine exhaust will flow into a superheater 7 heating the steam from a high pressure boiler from 680° F. to 1005° F. at a discharge pressure of 2415 psia. The discharged steam from the superheater will flow into a high pressure-high temperature steam turbine from which it will be discharged by the turbine at 328° F. and 100 psia through line 18 to the reheater coil 5B of the economizer-reheater apparatus 5. The gas turbine exhaust discharged from the superheater 7 at a temperature of 895° F., will flow into a high pressure boiler 6. The feedwater to the high pressure boiler, at a temperature and pressure of 664° F. and 2700 psia will be converted to steam with a temperature and pressure of 680° F. and 2700 psia. The temperature of the exhaust on the hot side of the high pressure boiler, consequently reduced to 700° F., will then flow into an economizer-reheater apparatus 5. The exhaust gas will be used to concomitantly heat the discharge of the high pressure-high temperature steam turbine from 328° F. to 680° F. in the reheater coil 5B and heat the boiler feed water from 228° F. to 664° F. in the economizer coil 5A. The temperature of the exhaust gas discharged from the economizer-reheater apparatus 5 will be reduced to 300° F. as result of the heat exchange. The reheater coil discharge at 680° F. and 80 psia will drive the low pressure turbine 9 and be condensed in the condenser 22. The condensate flow of 446,400 lbs./hr. from the condenser 22 will be pumped to the low temperature preheater 2 to join with a makeup water flow of 39,000 lbs./hr. The combined flow will be heated by the low temperature preheater 2 from 100° F. to 165° F. and then by the deaerator 3 to 228° F. The combined feedwater will then flow into the economizer coil 5B of the economizer-reheater apparatus 5. The exhaust gas of the economizer-reheater apparatus 5 will be discharged to the deaerator 3 at a temperature of 300° F. in which it will be further cooled to a discharge temperature of 260° F. It will then be delivered to the low temperature preheater 2 from which it will be vented as exhaust at a temperature of 230° F.

The quantities enumerated herein apply to the particular example in which 39,000 lb./hr. of steam is extracted from the high pressure-high temperature steam turbine for injection into the gas turbine for reasons unrelated to the present invention.

I claim:

1. A process for recapturing waste heat from the exhaust of a gas turbine to drive a high pressure-high temperature steam turbine and a low pressure steam turbine comprising the steps of:
    (a) delivering the exhaust of the gas turbine to the hot side of an economizer-reheater apparatus;
    (b) delivering a heated stream of feedwater and recycled condensate through the cold side of the economizer-reheater apparatus in an indirect heat exchange relationship with the gas turbine exhaust on the hot side of the economizer-reheater apparatus to elevate the temperature of the feedwater and recycled condensate to a temperature below the pinch point of the boiler;
    (c) delivering the discharge from the high pressure-high temperature steam turbine through the economizer-reheater apparatus in an indirect heat exchange relationship with the gas turbine exhaust on the hot side of the economizer-reheater apparatus;
    (d) driving the high pressure-high temperature steam turbine with the discharged stream of feedwater and recycled condensate which is heated to a temperature below the pinch point of the boiler by the economizer-reheater apparatus; and
    (e) driving the low pressure steam turbine with the discharged stream of the high pressure-high temperature steam turbine reheated below the pinch point of the boiler by the economizer-reheater apparatus.

2. A process in claim 1 further comprising the steps of delivering the heated stream of feedwater and recycled condensate from the economizer-reheater apparatus to a high pressure boiler before delivery to a high pressure-high temperature steam turbine and converting said steam to high pressure steam.

3. A process as in claim 2 further comprising the steps of delivering the high pressure steam from the high pressure boiler, to a superheater before delivery to a high pressure-high temperature steam turbine and further heating the high pressure steam in the superheater.

4. A process as in claim 1 further comprising the step of heating the stream of feedwater and recycled condensate in a low temperature preheater before delivery to an economizer-reheater apparatus.

5. A process as in claim 4 further comprising the step of delivering the heated stream of feedwater and recycled condensate from the low temperature preheater to a deaerator before delivery to an economizer-reheater apparatus and further heating said stream in the deaerator by indirect heat exchange with the exhaust from the gas turbine exhaust.

6. A process as in claim 3 wherein the high pressure steam is heated in the superheater by indirect heat exchange with the exhaust from the gas turbine.

7. A process as in claim 5 wherein the flow of feedwater and recycled condensate is heated in the low temperature preheater by indirect heat exchange with the gas turbine exhaust.

8. A process as in claim 1 wherein the fluid in the reheater coil is reheated through about the temperature range and by the same fluid as the fluid as the fluid in the economizer coil.

9. A process as in claim 1 wherein the temperature of the gas turbine exhaust entering the hot side of the economizer-reheater apparatus is 500° F. to 800° F.; the temperature of the feedwater-recycled condensate entering a cold side of the economizer reheater apparatus is 180° F. to 350° F.; the temperature of the discharge from the high pressure-high temperature steam turbine entering another cold side of the economizer-reheater apparatus is 250° F. to 400° F.; the temperature of the gas turbine exhaust discharged from the hot side of the economizer-reheater apparatus is 250° F. to 500° F.; the temperature of the feedwater-recycled condensate discharged from the cold side of the economizer-reheater apparatus is 500° F. to 700° F.; and the temperature of the discharge from the high pressure-high temperature steam turbine discharged from the other cold side of the economizer-reheater apparatus is 400° F. to 800° F.

10. A process as in claim 2 wherein the temperature of the feedwater and recycled condensate stream entering the cold side of the high pressure boiler is 500° F. to 700° F.; the temperature of the gas turbine exhaust entering the hot side of the high pressure boiler is 700° F. to 1000° F.; the discharge of the feedwater and recycled condensate stream, converted to high pressure steam, is 500° F. to 700° F.; and the gas turbine exhaust discharged from the hot side of the high pressure boiler is 600° F. to 900° F.

11. A process as in claim 6 wherein the temperature of the gas turbine exhaust entering the hot side of the superheater is 850° F. to 1400° F.; the temperature of the high pressure steam entering the cold side of the superheater is 500° F. to 700° F.; the temperature of the gas turbine exhaust discharged from the hot side of the superheater is 750° F. to 1050° F.; and the temperature of the high pressure steam discharged to the high pressure-high temperature steam turbine is 750° F. to 1050° F.

12. A process as in claim 7 wherein the temperature of the gas turbine exhaust entering the hot side of the preheater is 250° F. to 500° F.; the temperature of the feedwater-recycled condensate entering the cold side of the preheater is 40° F. to 150° F.; the temperature of the gas turbine exhaust discharged from the preheater is 100° F. to 400° F.; and the temperature of the feedwater-recycled condensate discharged to the deaerator is 40° F. to 250° F.; the temperature of the gas turbine exhaust entering the hot side of the deaerator is 250° F. to 500° F.; the temperature of the feedwater-recycled condensate entering the cold side of the deaerator is 40° F. to 250° F.; the temperature of the gas turbine exhaust discharged to the low temperature preheater is 250° F. to 500° F.; and the temperature of the feedwater-recycled condensate discharged to the economizer-reheater apparatus is 180° F. to 350° F.

13. A process as in claim 6 further comprising the addition of supplementary heat to the gas turbine exhaust before delivery to the superheater.

* * * * *